United States Patent [19]

Schaefer

[11] 4,088,469

[45] May 9, 1978

[54] ENVIRONMENTAL CONTROL OF A GLASS FIBER FORMING BUSHING

[75] Inventor: William L. Schaefer, Gibsonia, Pa.

[73] Assignee: PPG Industries, Inc., Pittsburgh, Pa.

[21] Appl. No.: 779,443

[22] Filed: Mar. 21, 1977

[51] Int. Cl.² ............................................. C03B 37/02
[52] U.S. Cl. ................................................ 65/5; 65/2; 65/12; 65/16
[58] Field of Search ........................... 65/2, 5, 16, 12

[56] References Cited

U.S. PATENT DOCUMENTS

| | | | |
|---|---|---|---|
| 2,224,466 | 12/1940 | Baker et al. | 65/16 |
| 2,234,986 | 3/1941 | Slayter et al. | 65/1 |
| 2,291,289 | 7/1942 | Slayter | 65/12 |
| 2,339,590 | 1/1944 | Thomas | 65/12 |
| 3,021,558 | 2/1962 | Roberson | 65/5 |
| 3,256,078 | 6/1966 | Drummond | 65/2 |
| 3,304,163 | 2/1967 | Holschlag | 65/2 X |
| 3,532,479 | 10/1970 | Stalego | 65/16 |
| 3,547,610 | 12/1970 | Holman | 65/12 X |
| 3,625,025 | 12/1971 | Jensen | 65/2 |
| 3,695,858 | 10/1972 | Russell | 65/2 |
| 3,697,241 | 10/1972 | Strickland et al. | 65/12 X |
| 3,829,301 | 8/1974 | Russell | 65/12 X |
| 3,836,346 | 9/1974 | Stalego | 65/16 X |
| 3,881,903 | 5/1975 | Stalego | 65/16 |
| 3,969,009 | 7/1976 | Reese | 65/12 X |
| 4,003,731 | 1/1977 | Thompson | 65/12 |
| 4,033,742 | 7/1977 | Nichols et al. | 65/12 X |

FOREIGN PATENT DOCUMENTS

| | | | |
|---|---|---|---|
| 114,570 | 1/1942 | Australia | 65/12 |
| 1,235,528 | 5/1960 | France | 65/12 |

OTHER PUBLICATIONS

Jet Flo-Transducer Union Flonetics Corp. Bulletin UFC-300.
Transvector Air Flow Amplifiers, Vortec Corp. 1974 © A Short Course on Transvector TM Air Flow Amplifiers etc.
Vortec Corp. © 1976.

*Primary Examiner*—Robert L. Lindsay, Jr.
*Attorney, Agent, or Firm*—Alan T. McDonald; John E. Curley

[57] ABSTRACT

A method and apparatus for forming glass fibers is disclosed. The method of the present invention involves passing a narrow, high velocity air stream horizontally below the bushing to thereby induce and entrain additional air flow from the environment surrounding the bushing into this air stream to flow generally horizontally below the bushing. Suitable apparatus, such as an air amplifier, is employed to produce this desired result.

5 Claims, 3 Drawing Figures

ENVIRONMENTAL CONTROL OF A GLASS FIBER FORMING BUSHING

BACKGROUND OF THE INVENTION

Glass fiber strand is typically formed by attenuating filaments through bushing tips located at the bottom of a heated glass fiber forming bushing containing molten glass. As the filaments are attenuated a binder and/or size is applied to them. The filaments are then gathered into one or more unified strands in a gathering shoe, which is typically a grooved wheel or cylinder formed of a material such as graphite. The strand or strands may then be collected on a rotating collet as a forming package, with the strand or strands being traversed across the face of the collet by means of a rotating spiral or traversing guide eye. In other applications, the strand or strands may be passed to a chopper and chopped into particulate strands, collected in a container after attenuation by means of a belt or wheel attenuator, or collected on a moving surface, for example, as a continuous strand mat.

In any glass fiber forming operation, control of the environment in the fiber forming region below the bushing is extremely important. Variations in either temperature or airflow in this region can lead to non-uniform filament diameters and thus to low quality strands. If the variations in either temperature or airflow are severe enough, the filaments may break, requiring a stoppage in the desired continuous operation and a reduction in productivity from the bushing.

Several means have been attempted in the past to control the environment below the bushing. A pair of blowers have been employed below the bushing to both attenuate the filaments from the bushing and aspirate air downwardly with filament flow. U.S. Pat. Nos. 2,234,986; 3,021,558; 3,532,479; 3,547,610; 3,836,346 and 3,881,903 describe such operations. In another operation, described in U.S. Pat. No. 3,969,099, an air stream is passed to the region directly below the bushing from a blower which diverts and irregularly deflects the air stream prior to its release to the bushing region. There is no illustration in this patent of aspirating any additional air from the environment around the bushing into the flow from the blower. In U.S. Pat. No. 4,033,731, a different air blower is disclosed including a plurality of fins for separating various sections of air from a header to produce an even air stream across the width of the bushing. In this patent, the airflow is in a generally vertical direction to both cool the region below the bushing and control the environment therein.

While such methods and apparatus have been successful to control the environment below the bushing, the methods and apparatus previously employed have consumed a great amount of high pressure air or other gaseous cooling fluid. It is desirable, therefore, to control the environment below the bushing while reducing substantially the consumption of compressed air or other gaseous cooling fluid necessary to give airflows sufficient to control the environment below the bushing.

THE PRESENT INVENTION

By means of the present invention, the environment below the bushing may be controlled with a substantial reduction in consumed compressed air, thus reducing substantially the cost resulting from controlling this environment. The method of the present invention comprises flowing a generally narrow, high velocity air stream in a generally horizontal direction below the bushing which induces and entrains additional conditioned air into the stream from the environment in the fiber forming region below the bushing. This combined air stream is sufficient to control the environment below the bushing. However, the amount of gaseous cooling fluid which must be supplied in a compressed state is substantially lower than the total air necessary to control the environment below the bushing, thus reducing substantially the cost involved in supplying environmental control air to the bushing.

The apparatus for producing this desired result preferably comprises an air amplifier. The air amplifier produces a narrow, high velocity air stream and induces and entrains air from the region surrounding the bushing into this air stream. The resulting total air stream is sufficient to control the environment, while only a fraction of the previously necessary compressed air is required.

BRIEF DESCRIPTION OF THE DRAWINGS

The present invention will be more fully described with reference to the drawings in which.

DETAILED DESCRIPTION OF THE DRAWINGS

Figure 1:
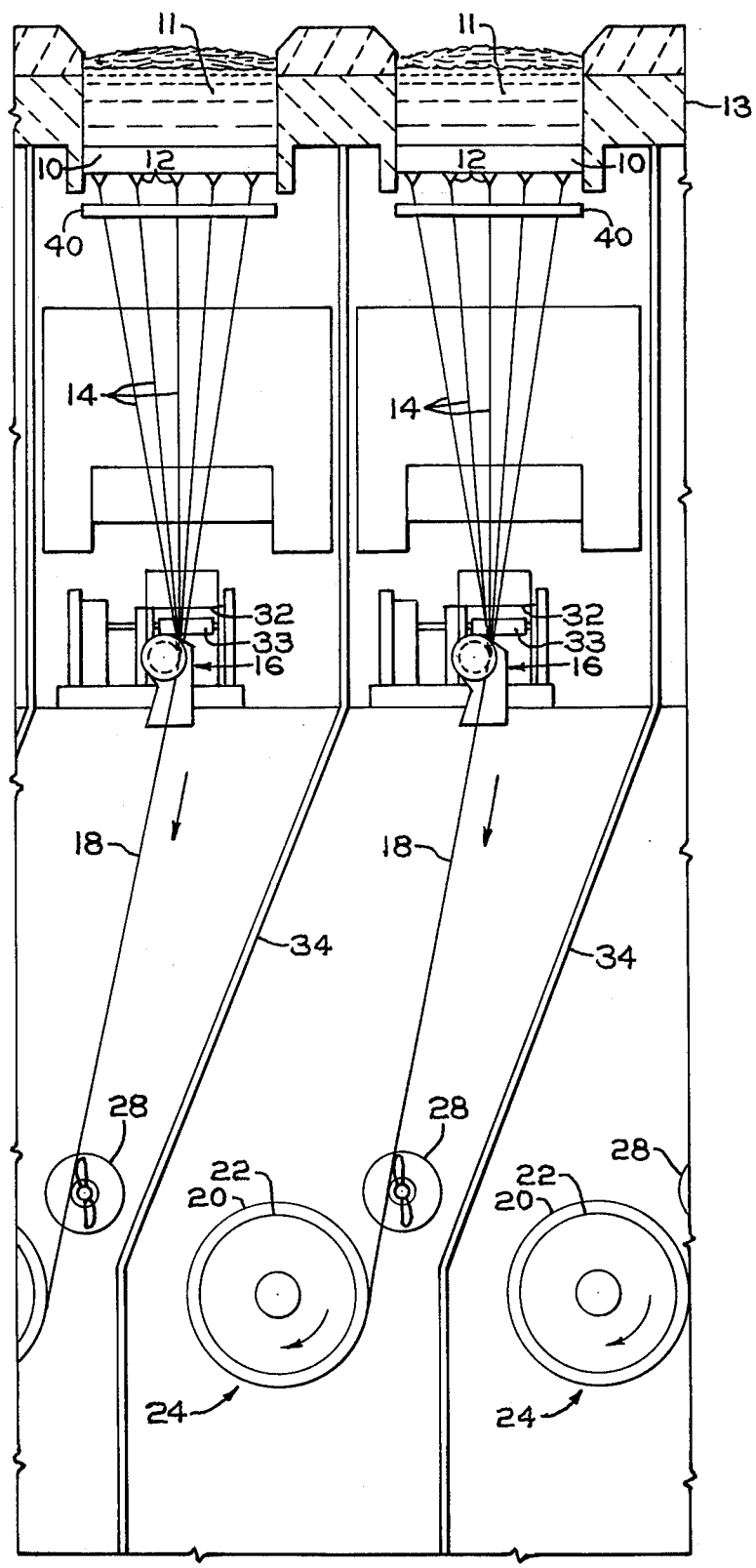
FIG. 1 is a front elevational view of a glass fiber forming operation including the method and apparatus of the present invention.

Turning to FIG. 1, glass filaments 14 are attenuated through bushing tips 12 located at the bottom of a heated bushing 10 containing molten glass 11 from forehearth 13. The filaments 14 pass downwardly past the air amplifier 40, which will be more fully described below. As can be seen in this Figure, the amplifier 40 preferably extends across the entire length of the bushing 10. The filaments then pass across the application surface 33 of an applicator 32 where they are coated with a binder and/or size. The filaments 14 are gathered into one or more unified strands in a gathering shoe 16, which is typically a grooved wheel or cylinder formed of a material such as graphite. Strand or strands 18 then pass across the face of and are traversed by a rotating spiral 28. The traversed strands 18 are then collected as a forming package 20 on a rotating collet 22 carried by a winder 24.

Alternatively, the strand or strands 18 could be traversed by a guide eye which traverses across the face of the rotating collet. In further alternatives, the strand or strands 18 could be passed between the blades and a backup surface of a chopper or between the wheels or belts of an attenuator and collected in a container.

Figure 2:
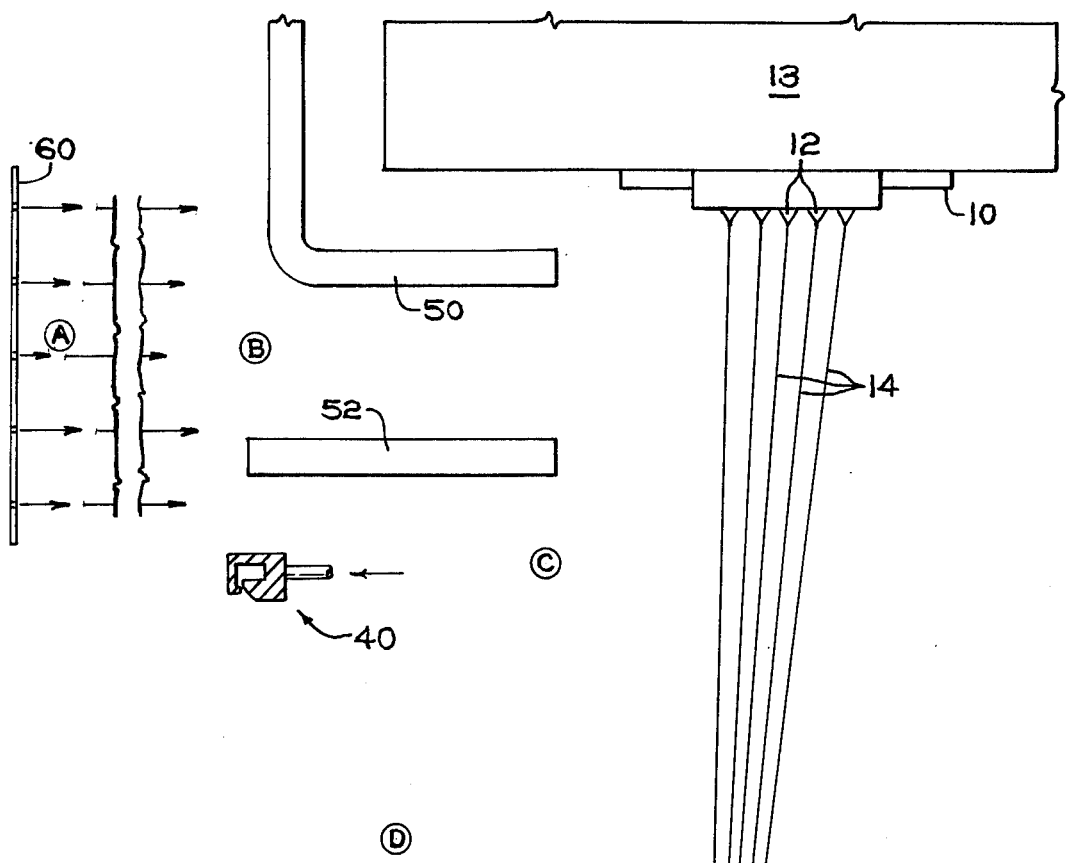
FIG. 2 is an enlarged side elevational view illustrating the location of the elements in the employment of the present invention.

FIG. 2 diagrammatically illustrates the location of the air amplifier in relation to the bushing. The filaments 14 are shown emanating from the bushing tips 12 at the bottom of the bushing 10 beneath the forehearth 13. Located in front of the bushing are a pair of cooling panels 50 and 52. These panels are small heat exchangers with a cooling fluid flowing therethrough. Located below these panels and in front of the bushing is the air amplifier 40. An air grill 60 located at a distance from the bushing supplies conditioned air for the environment surrounding the bushing. For example, this grill 60 may be spaced from the bushing 10 at a distance of approximately 9.0 feet (2.7 meters).

Figure 3:
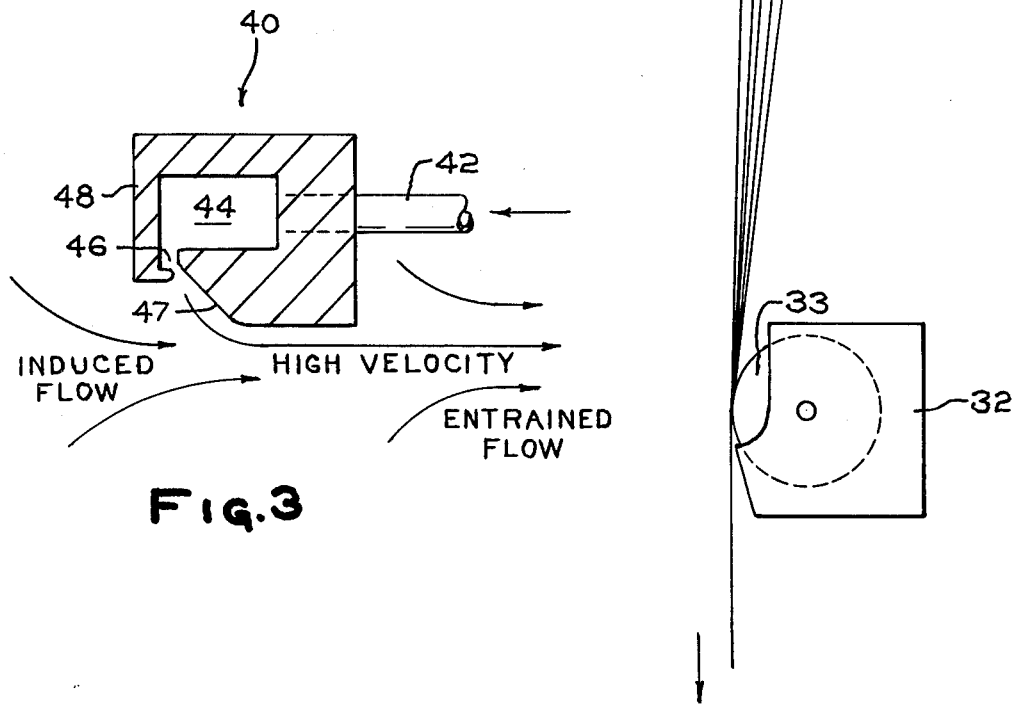
FIG. 3 is a cross-sectional view of the air amplifier employed in the present invention, illustrating the airflow pattern resulting from use of this apparatus.

As can best be seen in FIG. 3, the amplifier 40 comprises a housing 48 having an internal chamber 44 therein. The chamber 44 is connected to a supply of pressurized gaseous fluid, such as compressed air, with suitable pressures ranging from about 10 to about 80 psig (0.7 to 5.6 kilograms per square centimeter gauge), by means of intake 42. Extending from one edge of the chamber 44 is a slot 46 formed by the walls of the housing 48. This slot runs the entire length of the amplifier 40, with the amplifier 40 preferably being of a length equal to the length of the bushing to provide airflow across the entire bushing. The high pressure gaseous fluid in the chamber 44 exists the amplifier 40 through the slot 46 in a generally downward direction with respect to the bushing. Due to the narrow width of this slot, i.e., about 0.001 to 0.010 inch (0.00254 to 0.0254 centimeter) and preferably about 0.002 to about 0.005 inch (0.00508 to about 0.0508 centimeter), the gaseous fluid leaving the amplifier exits through the slot 46 at a high velocity. By means of the Coanda effect, the high velocity air stream turns around the edge 47 of the amplifier 40 and flows in a generally horizontal path below the bushing 10. In addition, a flow of air from behind the high velocity air stream emanating from the amplifier 40 is induced to flow with this high velocity airflow. Further, air in front of the amplifier 40 is entrained into the air stream formed by the high velocity and induced flow air. This composite gaseous fluid flow is then passed in a generally horizontal direction below the bushing to control the environment in the fiber forming region below the bushing by maintaining consistent airflows and temperatures in this region below the bushing and thus preventing filament breakouts and increasing productivity and filament diameter consistency. One amplifier which has been found suitable for use in the present invention is a Transvector™ air amplifier, Model 522, made by the Vortec Corporation. Other length units, sized to various bushing requirements, may also be used.

As previously mentioned, the major advantage of the present invention is the amplification of the airflow emanating from the amplifier 40. With the previously known environmental control systems, all or substantially all of the air supplied to the region below the bushing passed through the blower or other airflow device. This air is high cost air, all of it being compressed and released from the compressed air source through the airflow device. However, unlike the previous devices, in the present invention only a small fraction of the air supplied by the total air stream to the bushing is from the compressed air source. Due to the induced and entrained airflows added to the high velocity airflow emanating from the amplifier 40, the total air stream seen by the bushing may range from about 2 to 30 or more times the compressed air supplied to the amplifier. Thus, one-half or more of the air stream is "free" air, as opposed to the expensive compressed air previously required. This reduces substantially compressed air costs while providing a consistent temperature and airflow below the bushing, thus resulting in high quality filament production.

EXAMPLE

An apparatus according to FIG. 2 was set up. The air amplifier 40 was located 9 inches (23.9 centimeters) below the bushing 10 and 19 inches (49.5 centimeters) in front of the bushing 10. Air was supplied through the grill 60, which was 9.0 feet (2.7 meters) in front of the bushing 10, in volumes of between about 1725 and 2070 cubic feet/minute (48.3 and 68.0 cubic meters/minute). Compressed air was supplied to the amplifier 40 at a pressure measured at 30 psig (2.1 kilograms per square centimeter gauge) at a point 30 feet (9.1 meters) upstream of a 0.25 inch (0.63 centimeter) supply line and at a volume of about 12 cubic feet/minute). Air velocities were measured at the four points indicated in FIG. 2 as A, B, C and D. Two sets of velocity measurements were made. The results were:

Example I

| Point | Velocity Feet/Minute | Direction | Velocity Meters/Minute |
|---|---|---|---|
| A | 750–900 | in | 228.6–274.3 |
| B | 150 | out | 45.7 |
| C | 200–600 | in | 61.0–182.9 |
| D | 250–350 | in | 76.2–106.7 |

Example II

| Point | Velocity Feet/Minute | Direction | Velocity Meters/Minute |
|---|---|---|---|
| A | 850–900 | in | 259.1–274.3 |
| B | 100–150 | out | 30.5–45.7 |
| C | 450–550 | in | 137.8–167.6 |
| D | 200–300 | in | 61.0–91.4 |

The "in" refers to airflow in the direction towards the bushing. The "out" refers to airflow in the direction away from the bushing.

For comparison, the air amplifier 40 was removed and another set of air velocity measurements were made, with the volume of air from the grill 60 at a rate between 1610 and 1840 cubic feet/minute (45.1 and 51.5 cubic meters/minute). Those results were:

Example III

| Point | Velocity Feet/Minute | Direction | Velocity Meters/Minute |
|---|---|---|---|
| A | 700–800 | in | 213.4–243.8 |
| B | 100–150 | out | 30.5–45.7 |
| C | 0–100 | out | 0–30.5 |
| D | 200–300 | in | 61.0–91.4 |

As can be seen, the velocities at point A, the air grill, point B, between the cooling panels 50 and 52, and point D, 16 inches below the bushing 10 and in front of the bushing 10 were unaffected by the presence or absence of the amplifier 40. However, air velocity at point C, below the bushing 10 and in front of the amplifier 40 changed from no flow or flow away from the bushing 10 to significant airflow towards the bushing 10. The net change in airflow approaches 700 percent. This illustrates the control of the environment below the bushing 10 made possible by employing the apparatus of the present invention.

From the foregoing, it is obvious that the present invention provides an efficient means for controlling the environment in the fiber forming region below a glass fiber forming bushing.

While the invention has been described with reference to certain specific embodiments thereof, it is not intended to be limited thereby, except as set forth in the accompanying claims.

I claim:

1. In a method of forming continuous glass fibers comprising attenuating glass filaments through bushing tips in a bushing, gathering the filaments into a unified strand, collecting the strand and passing a stream of gaseous fluid across the bushing in a generally horizontal direction to control the environment in the fiber forming region below the bushing, the improvement comprising flowing a narrow, high velocity gaseous fluid stream from a means for providing said gaseous fluid stream in a generally horizontal path below the bushing, said velocity being sufficient to induce and entrain air from the region below the bushing into said high-velocity gaseous fluid stream and in a generally horizontal direction to thereby provide a total gaseous fluid stream across the bushing in a generally horizontal direction of at least double in volume the volume of the gaseous fluid flowing from said means for providing said gaseous fluid stream, said means being located in a position to control the environment of said bushing.

2. The method of claim 1 wherein said means for providing said gaseous fluid stream comprises an air amplifier.

3. The method of claim 2 wherein said air amplifier is provided with compressed air at a pressure of between about 10 and 80 psig (10.7 and 5.6 kilograms per square centimeter gauge).

4. In an apparatus for forming continuous glass fibers comprising a bushing having a plurality of bushing tips through which filaments are attenuated, means for gathering the filaments into a unified strand, means for collecting the strand and means for supplying a gaseous fluid stream across the bushing in a generally horizontal direction to control the environment in the fiber forming region below the bushing, the improvement wherein said means for providing said gaseous fluid stream comprises a means for providing a narrow, high-velocity gaseous fluid stream in a generally horizontal direction across the bushing, said velocity being sufficient to induce and entrain air from the region below the bushing into said gaseous fluid stream and in a generally horizontal direction to thereby provide a total gaseous fluid stream across the bushing in a generally horizontal direction having a volume at least double the volume of the gaseous fluid flowing from the means for providing said gaseous fluid stream, said means for providing said gaseous fluid stream being located in a position to control the environment of said bushing.

5. The apparatus of claim 2 wherein said means for providing said gaseous fluid stream comprises an air amplifier.

* * * * *

UNITED STATES PATENT AND TRADEMARK OFFICE
CERTIFICATE OF CORRECTION

PATENT NO. : 4,088,469
DATED : May 9, 1978
INVENTOR(S) : William L. Schaefer

It is certified that error appears in the above–identified patent and that said Letters Patent are hereby corrected as shown below:

Column 6, line 1, Claim 3, "10.7" should be ---0.7---.

Signed and Sealed this

Thirty-first Day of October 1978

[SEAL]

Attest:

RUTH C. MASON
*Attesting Officer*

DONALD W. BANNER
*Commissioner of Patents and Trademarks*